W. H. SHEASBY.
ROLLER BEARING.
APPLICATION FILED DEC. 14, 1907.
902,691.
Patented Nov. 3, 1908.
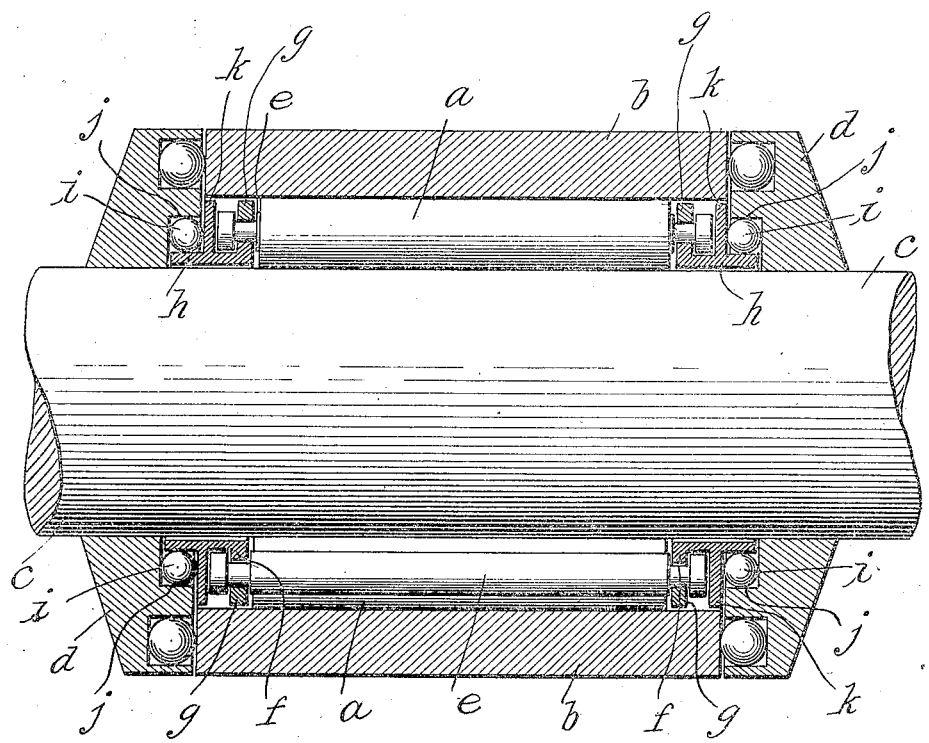
Witnesses
Edwin L. Yewell
Inventor
William H. Sheasby
By Davis & Davis
Attorneys

UNITED STATES PATENT OFFICE.

WILLIAM H. SHEASBY, OF LOS ANGELES, CALIFORNIA.

ROLLER-BEARING.

No. 902,691.　　　Specification of Letters Patent.　　　Patented Nov. 3, 1908.

Application filed December 14, 1907. Serial No. 406,499.

*To all whom it may concern:*

Be it known that I, WILLIAM H. SHEASBY, a citizen of the United States of America, and a resident of Los Angeles, county of Los Angeles, State of California, have invented certain new and useful Improvements in Roller-Bearings, of which the following is a full and clear specification, reference being had to the accompanying drawing, in which is represented a vertical longitudinal section of a shafting journal-box constructed according to my invention.

This invention relates to that class of journals in which the series of load-sustaining rollers is properly spaced by intervening spacing rollers of smaller diameter, and the object of the present invention is to improve that type of bearing and render it cheaper to manufacture and assemble, as more fully hereinafter set forth.

Referring to the drawings by reference characters, $a$ designates the load-sustaining rollers having contact with the interior of the box $b$ and the exterior of the shaft $c$, this box being held against endwise movement on the shaft by means of thrust collars $d$ on the shaft said thrust collars being provided near their outer edges with a ball raceway receiving balls against which the ends of the box abut. I have shown the invention applied to a journal-box for shafting but it will be understood that the invention is applicable to car and other journals without alteration of the essential parts of this invention.

The usual spacing rollers $e$ are arranged between the load-rollers and have their ends as usual projecting beyond the load-rollers and provided each with an annular groove in which engages an annular track $f$ surrounding the shaft but unconnected thereto. These grooved ends of the spacing rollers are confined upon the tracks by the usual loose rings $g$ resting on the grooved necks of the rollers in radial alinement with the tracks.

Each track is provided with or formed on a sleeve $h$ which extends into an annular recess in the adjacent face of the thrust collar, this recess in the thrust collar being large enough to form in conjunction with said sleeve $h$ a raceway for a series of balls $i$, the balls bearing upon the outer face or periphery of the sleeve and the inwardly facing shoulder $j$ formed by the recess in the collar. The sleeve $h$ at a point between the track flange and its other end is provided with a radial flange $k$ which forms another wall of the ball raceway.

It will be observed that the tracks $f$ are not fastened to the shaft but are on the other hand free to rotate independently thereof as well as independently of the box and the rollers; in other words, each track flange is maintained in a sort of floating condition, being supported on the balls $i$ which balls also, by reason of the radial flange $k$, take up the end thrust of the floating tracks. A bearing of this type will be easy to make and assemble and at the same time it may be made as accurately as that type of bearing in which the tracks are fastened to the shafting or to the box.

Having thus fully described my invention, what I claim as new and desire to secure by Letters Patent, is:—

1. In combination, a shaft, a box, a series of load-sustaining rollers and a series of spacing rollers, the ends of the latter being grooved, thrust receiving collars on the shaft each being provided with an annular groove adjacent to the shaft, sleeves loosely surrounding the shaft and each having one end entering said groove in the adjacent thrust collar, said sleeve carrying a track flange at its other end and a radial flange intermediate its ends, a series of balls confined by the sleeve and said radial flange in the groove in the thrust collar, and confining rings engaging the grooves in the spacing rollers.

2. In combination, a box, a shaft, load rollers, spacing rollers having grooved ends, confining rings engaging these grooves, a floating sleeve loosely surrounding the shaft at each end of the bearing, each of these sleeves being provided with flanges forming part of a ball raceway, a series of balls in said raceway, and collars forming the other part of said raceways.

In testimony whereof I hereunto affix my signature in the presence of two witnesses this 2nd day of December 1907.

WM. H. SHEASBY.

Witnesses:
　LOUISA J. SHEASBY,
　FLORENCE E. FIELD.